Oct. 13, 1959     R. F. TOWNSEND ET AL     2,908,460
FISHING POLE HOLDER
Filed Aug. 30, 1955
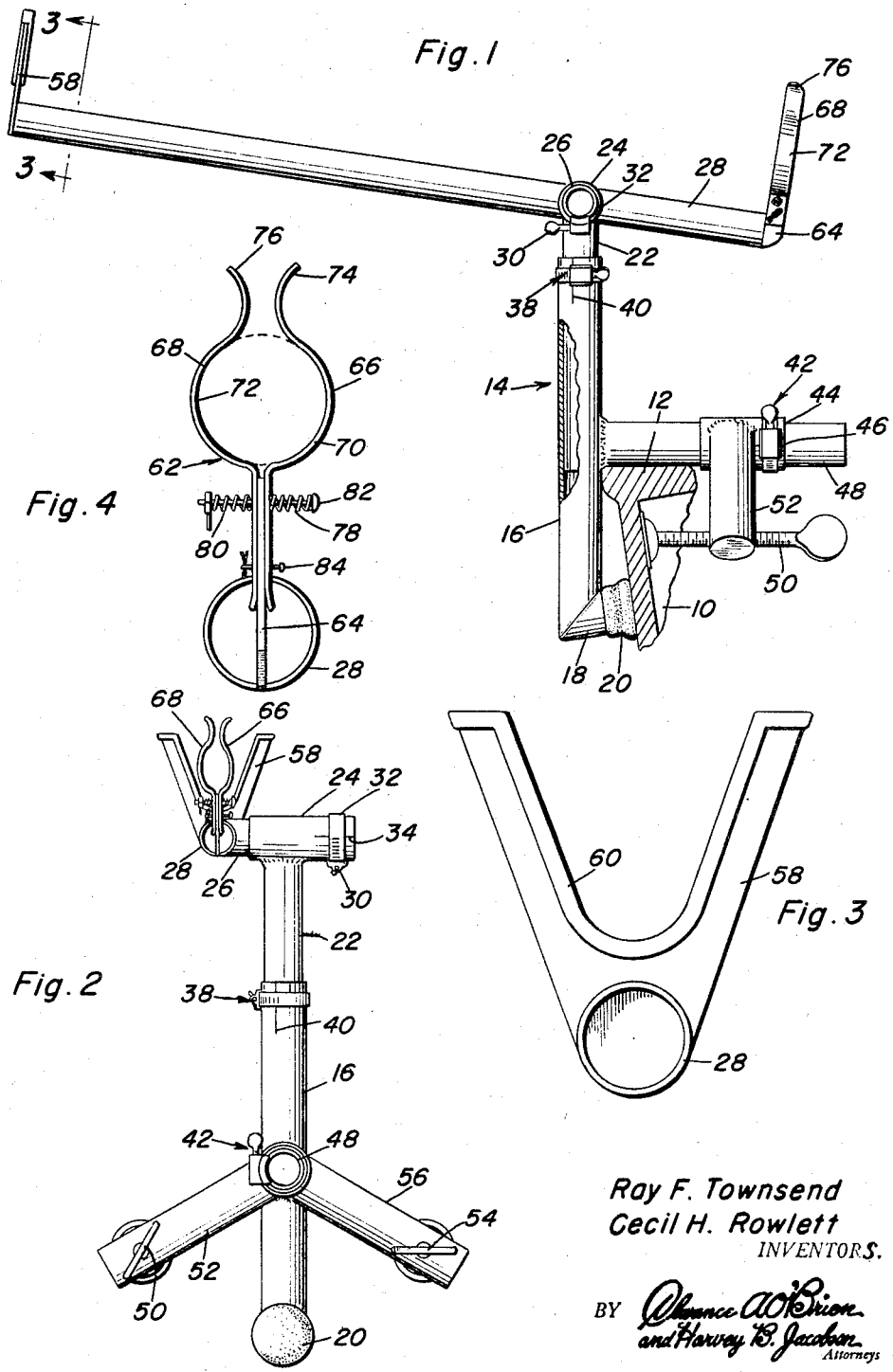
Ray F. Townsend
Cecil H. Rowlett
INVENTORS.

United States Patent Office 2,908,460
Patented Oct. 13, 1959

2,908,460

FISHING POLE HOLDER

Ray F. Townsend, Dade City, and Cecil H. Rowlett, Trilby, Fla.

Application August 30, 1955, Serial No. 531,400

2 Claims. (Cl. 248—40)

This invention relates to fishing rod holders and particularly to a holder adapted to be connected to a boat and capable of various adjustments.

An object of the present invention is to provide a sturdy, lightweight fishing pole holder of the type adapted for attachment to the gunwale or some other part of a boat, wherein the fisherman may rest his pole for periods of time as he sees fit.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of one embodiment of the invention showing it attached to a part of a boat;

Figure 2 is an end view of the fishing rod holder shown in Figure 1;

Figure 3 is an enlarged sectional view taken on a line 3—3 of Figure 1 and in the direction of the arrows, showing the pole holding means at one end of the supporting rod; and Figure 4 is an end view of the pole holding means at the other end of the supporting rod.

Although the fragment 10 of a boat is representative of a suitable support to which the fishing rod holder may be attached, in the illustrated fragment 10 the gunwale 12 serves as a support on which to rest a part of the clamping means for the fishing pole holder.

Holder 14 consists of a hollow tube 16 at the lower end of which there is a foot 18 projecting laterally at approximately right angles to the longitudinal axis of said tube. A resilient cup 20 is secured to the outer end of the laterally extending foot 18 and this cup may be of suitable material, as rubber or plastic. The remainder of the fishing rod holder is preferably made of a lightweight metal, for example, aluminum.

Tube 16 is adapted to be maintained in a vertical position and the upper end thereof is open to accommodate spindle 22 which may be hollow and tubular to reduce weight. The lower end portion of spindle 22 is rotatably and slidably telescoped in the tube 16, and there is a transverse collar 24 at the upper end of the spindle. This collar has its longitudinal axis at right angles to the longitudinal axis of the spindle 22. Collar 24 functions to support a laterally extending stud 26 which is rotatable therein. This stud is fixed, as by soldering or welding to a fishing pole supporting rod 28 at the ends of which there are means to accommodate the fishing pole.

In order to adjust the inclination of rod 28, screw 30 of clamp 32 is loosened thereby allowing the ends of collar 24 to separate slightly, inasmuch as there is a pair of splits 34 in the outer end of collar 24 on which the clamp 32 is positioned. When the desired inclination of rod 28 is obtained, the screw 30 is tightened, thereby tightening clamp 32 on collar 24 and squeezing it tightly against the outer surface of the stud 26. A clamp 38 identical to the clamp 32 is disposed on the upper end of tube 16 over the splits 40 and serves to hold the spindle 22 in the selected position of rotation and slidable extensibility with respect to tube 16. A third clamp 42 identical to the previously described clamps 24 and 38 is disposed on a collar 44.

The clamp 42 and collar 44 constitute a portion of the means for fastening the fishing pole holder to the gunwale of a boat or some other suitable support. Collar 44 has splits 46 in it and is slidably disposed on a laterally extending rod 48 which is fixed to the tube 16 intermediate the upper and lower ends of the latter. A screw 50 is threaded transversely through tube 52 near one end thereof, and there is another screw 54 threaded through tube 56. Tubes 52 and 56 are secured to and project radially from the collar of 44 and they are arranged in divergent relation at an angle of less than 180 degrees to each other so that the screws 50 and 54 may contact spaced points on the inner surface of the boat 10. Also aiding in the clamping function is the laterally extending tube 48 which seats upon the top of the gunwale 12 and the foot 18 which has its pad 20 contacting the outer surface of the boat.

The outer end of rod 28 is provided with a V-shaped bracket 58 which opens upwardly and has a flange-lined seat, 60. A part of the fishing pole is adapted to rest in this seat. The handle portion of the fishing pole is adapted to be held in the clamp 62 which consists of a vertical plate 64 fixed to the inner end of rod 28, on which plate jaws 66 and 68 are mounted. These jaws have rod handle engaging portions 70 and 72 at the ends of which there are curved cam portions 74 and 76 to aid in guiding the fishing pole handle into the portions 70, 72. The jaws are spring pressed together by means of springs 78 and 80 which bear against the outer surfaces of the jaws and are mounted on a headed shank 82 that passes through aligned apertures in the jaws and also plate 64. Limiting pin 84 passes through aligned openings in the jaws and plate 64 at a point spaced from the shank 82. This permits the jaws to be rocked open but holds the jaws assembled with the plate 64. Limiting pin 84 has a head at one end and a cotter-key, or the like, at the opposite end to retain it in place.

In use of the holder, clamp 42 is loosened and the collar 44 is slid out on tube 48 until tube 48 may be rested on the gunwale of the boat without first loosening screws 50 and 54. Then the collar 44 is slid on the tube 48 until tubes 52 and 56 touch the inner edge of the boat gunwale. After tightening clamp 42, the screws 50 and 54 are tightened with only a minimum of adjustment. About one-half turn of screws 50 and 54 is all that is necessary after the holder has been previously mounted on the gunwale of the boat. The inclination of rod 28 and height and orientation of the spindle 22 are adjusted to suit the fisherman usually only once, whereupon he is ready to place his fishing pole in the mounting means at the inner and outer ends of rod 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a fishing pole holder, the combination of a vertical tube, a horizontal shank secured at one end thereof to an intermediate portion of said tube and extending laterally therefrom, a tubular sleeve slidable on said shank and having a split end portion, a clamp positioned on the split end portion of said sleeve for frictionally locking the same in a predetermined position on said shank, a pair of downwardly divergent arms secured at their upper ends to said sleeve and disposed in a common vertical plane, a pair of clamp screws extending through threaded bores formed in lower end portions of said arms, said screws having their axes parallel to said shank and being adapted to engage one side of a supporting structure at two horizontally spaced points, a laterally projecting foot provided at the lower end of said tube and adapted to engage the opposite side of the stated supporting structure at a point spaced equally between said screws, and fishing pole supporting means provided at the upper end of said tube.

2. In a fishing pole holder, the combination of a supporting rod, a flat plate having one edge thereof secured diametrically to one end of said rod and projecting radially beyond the periphery of the rod, a pair of complemental pole clamping jaws disposed at opposite sides of said plate, a transverse pin extending through said jaws and said plate, a pair of compression springs provided on opposite end portions of said pin and urging the respective jaws against the oposite sides of the plate, keeper means for said springs provided at the ends of said pin, and a pin-shaped keeper element extending slidably through aligned apertures formed in said jaws and said plate at a point spaced from said transverse pin.

References Cited in the file of this patent

UNITED STATES PATENTS

| | | |
|---|---|---|
| 1,856,477 | Gerline | May 3, 1932 |
| 2,311,823 | Gaskill, Sr. | Feb. 23, 1943 |
| 2,466,801 | Fong | Apr. 12, 1949 |
| 2,522,255 | Climo | Sept. 12, 1950 |
| 2,548,650 | Brandt | Apr. 10, 1951 |

FOREIGN PATENTS

| | | |
|---|---|---|
| 518,237 | Germany | Feb. 13, 1931 |